US009177266B2

(12) United States Patent  
Rasmussen et al.

(10) Patent No.: US 9,177,266 B2  
(45) Date of Patent: Nov. 3, 2015

(54) METHODS AND SYSTEMS FOR IMPLEMENTING ANCESTRAL RELATIONSHIP GRAPHICAL INTERFACE

(75) Inventors: Matt Rasmussen, Provo, UT (US); Harold Madsen, Provo, UT (US); Gary Mangum, Provo, UT (US)

(73) Assignee: ANCESTRY.COM OPERATIONS INC., Provo, UT (US)

( * ) Notice: Subject to any disclaimer, the term of this patent is extended or adjusted under 35 U.S.C. 154(b) by 984 days.

(21) Appl. No.: 13/035,816

(22) Filed: Feb. 25, 2011

(65) Prior Publication Data

US 2012/0221977 A1    Aug. 30, 2012

(51) Int. Cl.
*G06F 3/048*        (2013.01)
*G06Q 10/00*        (2012.01)
*G06F 3/0481*       (2013.01)

(52) U.S. Cl.
CPC .............. *G06Q 10/00* (2013.01); *G06F 3/0481* (2013.01)

(58) Field of Classification Search
CPC .... G06Q 10/00; G06F 3/0481; G06F 3/04817
USPC ......................................................... 715/835
See application file for complete search history.

(56) References Cited

U.S. PATENT DOCUMENTS

| | | | |
|---|---|---|---|
| 5,842,218 A * | 11/1998 | Robinson | 1/1 |
| 6,467,052 B1 * | 10/2002 | Kaler et al. | 714/39 |
| 6,496,842 B1 * | 12/2002 | Lyness | 715/206 |
| 6,570,567 B1 * | 5/2003 | Eaton | 345/428 |
| 7,257,776 B2 | 8/2007 | Bailey et al. | |
| 7,791,770 B2 | 9/2010 | Nomura | |
| 8,224,862 B2 | 7/2012 | Sacks | |
| 2001/0054089 A1 | 12/2001 | Tso et al. | |
| 2003/0193481 A1 | 10/2003 | Sokolsky | |
| 2004/0030778 A1 * | 2/2004 | Kronenberg et al. | 709/224 |
| 2004/0125124 A1 * | 7/2004 | Kim et al. | 345/716 |
| 2006/0039030 A1 * | 2/2006 | Peterschmidt | 358/1.15 |
| 2007/0061424 A1 * | 3/2007 | Mattaway | 709/219 |
| 2007/0079286 A1 * | 4/2007 | Cook et al. | 717/113 |
| 2007/0171224 A1 * | 7/2007 | MacPherson | 345/440 |
| 2008/0092077 A1 * | 4/2008 | Mather et al. | 715/781 |

(Continued)

OTHER PUBLICATIONS

Happy, Robert, Microsoft Project 2010 Project Management: Real World Skills for Certification and Beyond, Wiley Publishing, pp. iv and 283-291 (published Aug. 9, 2010).*

*Primary Examiner* — Doon Chow  
*Assistant Examiner* — Conrad Pack  
(74) *Attorney, Agent, or Firm* — Kilpatrick Townsend & Stockton LLP

(57) ABSTRACT

According to the invention, a method for displaying genealogical records may include providing a plurality of genealogical records, providing a plurality of icons, and associating each genealogical record with an icon. The method may also include providing a genealogical display and positioning a first icon in a docking field of the genealogical display. The method may further include displaying on a display device the first icon in the docking field, information about the genealogical record associated with the first icon, and other icons that represent genealogical records linked to the genealogical record represented by the first icon, where the other icons are arranged according to their relationship with the first icon. The method may additionally include replacing the first icon in the docking field with a second icon representing a different genealogical record and updating the icons displayed on the display device without shifting focus from the displayed icons.

11 Claims, 8 Drawing Sheets

(56) References Cited

U.S. PATENT DOCUMENTS

| | | |
|---|---|---|
| 2008/0168357 A1 | 7/2008 | Firebaugh et al. |
| 2008/0288886 A1 | 11/2008 | Sherwood et al. |
| 2009/0031239 A1 | 1/2009 | Coleran et al. |
| 2009/0152349 A1 | 6/2009 | Bonev et al. |
| 2009/0172603 A1 | 7/2009 | Young Suk Lee |
| 2009/0198725 A1 | 8/2009 | Lee et al. |
| 2009/0249257 A1 | 10/2009 | Bove et al. |
| 2009/0292989 A1 | 11/2009 | Matthews et al. |
| 2010/0083173 A1 | 4/2010 | Germann et al. |
| 2010/0185949 A1 | 7/2010 | Jaeger |
| 2010/0199222 A1 | 8/2010 | Kranik et al. |
| 2011/0072009 A1 | 3/2011 | Tuttle et al. |
| 2011/0148878 A1 | 6/2011 | Baikie |
| 2011/0161805 A1 | 6/2011 | Slinker |
| 2011/0231796 A1 | 9/2011 | Vigil |
| 2012/0054190 A1 | 3/2012 | Peters |
| 2012/0054554 A1* | 3/2012 | Dagan ............................. 714/39 |
| 2012/0060188 A1* | 3/2012 | Stallings et al. ................ 725/44 |
| 2012/0062564 A1 | 3/2012 | Miyashita et al. |
| 2012/0089920 A1* | 4/2012 | Eick ............................ 715/739 |

\* cited by examiner

METHODS AND SYSTEMS FOR IMPLEMENTING ANCESTRAL RELATIONSHIP GRAPHICAL INTERFACE

BACKGROUND OF THE INVENTION

The present invention relates generally to methods and systems for displaying records in one or more views and more specifically to methods and systems for transitioning between displayed records and/or between one or more views.

Records are often kept by individuals and organizations to track and/or store various pieces of information. The information found in records is often obtained form various documents or other sources. For example, a company may maintain a database that includes a record of sales of one or more products. Another common type of record that is created and/or maintained is ancestral or genealogical records that include information about individuals and/or family members. These records often include relationship information to identify how records and sub-records are related or connected. These records may include other information as well, such as date of birth, date of death, date of marriage, city and/or state of residence, spouse information, children information, etc.

It is often desired and/or important to visually display how records and/or sub-records are linked or related (i.e., display the connections between records). For example, in genealogical records, it may be helpful to display an individual's ancestors so that users can visually determine how the individual is connected or interconnected with other individuals in the genealogical record. Showing the connectedness of other records may likewise be important, such as the connection between employee records, school records, sales records, company history records, etc. Because of the usefulness of such displays, there is a need in the art for improved ways to display records.

BRIEF SUMMARY OF THE INVENTION

In one embodiment, a method for displaying records and/or transitioning between genealogical records on a display device is provided. The method may be performed on a system that includes a processor and a storage device having a set of instructions stored thereon. The instructions may cause the processor to perform one or more of the method steps. Further the system may include a communication interface to receive input from a user and/or provide output to a display device or other system. The communication interface may also allow the system to communicate with a remote system to perform the method steps over a network. The storage device may include a non-volatile storage medium.

The method of displaying records and/or transitioning between records may include providing, receiving, and/or storing a plurality of genealogical records, such as providing the records from a storage device or storing the records on a storage device. The records may also be input from a user. The method may also include providing a plurality of icons and associating each genealogical record with an icon of the plurality of icons. The method may further include providing a genealogical display to be displayed on a display device. The genealogical display may include a docking field that is configured to receive an icon, such as by having a user select and drag a displayed icon into the docking field. When an icon is positioned in the docking field, information about the genealogical record associated with the icon may be displayed on the display device.

The genealogical display may also include a plurality of progeny fields linked to the docking field and configured to receive and display icons of genealogical records linked to the genealogical record of the icon positioned in the docking field. The arrangement of the icons displayed in the progeny fields may be based on a progeny relationship between the records represented by icons in the progeny fields and the record represented by the icon in the docking field. The genealogical display may further include a plurality of ancestral fields linked to the docking field and configured to receive and display icons of genealogical records linked to the genealogical record of the icon positioned in the docking field. The arrangement of the icons displayed in the ancestral fields may be based on an ancestral relationship between the records represented by icons in the ancestral fields and the record represented by the icon positioned in the docking field. The genealogical display may additionally include a plurality of sibling fields linked to the docking field and configured to receive and display icons of genealogical records linked to the genealogical record of the icon positioned in the docking field. The arrangement of the icons displayed in the sibling fields may be based on a sibling relationship between the records represented by icons in the sibling fields and the record represented by the icon positioned in the docking field.

The method of displaying records and/or transitioning between records may additionally include positioning a first icon in the docking field, such as by receiving input from a user via the communication interface to position the first icon in the docking field. The method may additionally include displaying on the display device the first icon positioned in the docking field, the information about the genealogical record associated with the first icon, and the icons of linked genealogical records in the sibling fields, progeny fields, and ancestral fields based on the respective relationships between the linked genealogical records and the genealogical record corresponding to the first icon. The method may additionally include replacing the first icon in the docking field with a second icon and updating the icons displayed in each of the docking field, the progeny fields, the ancestral fields, and sibling fields without shifting focus from the displayed icons.

Replacing the first icon with the second icon may include selecting the second icon from one of the progeny, sibling, or ancestral fields and dragging the second icon into the docking field. Alternatively or additionally, replacing the first icon in the docking field may include scrolling between the first and second icons so that the second icon which is positioned in one of the progeny, sibling, or ancestral fields adjacent to the docking field replaces the first icon in the docking field. In addition, replacing the first icon in the docking field may include positioning a third icon in one of the progeny, sibling, or ancestral fields so that the second icon is positioned in the docking field based on a link between the second and third icons, such as based on the relationship (sibling, progeny, or ancestral relationship) between the records corresponding to the second and third icons.

Updating the icons may include transferring one or more of the icons of linked genealogical records from one of the progeny fields, sibling fields, or ancestral fields to a new field based on the relationship between the one or more icons and the second icon newly positioned in the docking field. The transition or transfer of icons may occur so that the transfer is substantially visually seamless to a user of the system. In addition, one or more icons may transfer or transition simultaneously with or nearly simultaneously with the transfer or transition of the first icon. In one embodiment, all the displayed icons transfer or transition simultaneously with or nearly simultaneously with the transfer of the first icon.

The genealogical display may further include a timeline that displays timeline information for the genealogical record associated with the first icon positioned in the docking field. The timeline may include one or more selectable regions so that selecting one of the selectable regions changes the information displayed about the genealogical record of the first icon or highlights one or more icons displayed on the display device. In one embodiment, the timeline comprises a continuous selectable region so that a user's finger or mouse pointer can be slid along the timeline to change the information that is displayed and/or highlight records and/or information.

The genealogical display may additionally include a second docking field (i.e., a descendant docking field) that is configured to receive an icon. When an icon is positioned in the second docking field, the genealogical display may change to a descendant view so that the icons of genealogical records progenically linked with the genealogical record of the icon positioned in the second docking field are displayed. These icons may be arranged and displayed according to the progenical links with the icon/record positioned in the second docking field.

Additionally or alternatively, the genealogical display may further include a third docking field (i.e., a ancestry docking field) that is configured to receive an icon. When an icon is positioned in the third docking field, the genealogical display may change to an ancestry view so that the icons of genealogical records ancestrally linked with the genealogical record of the icon positioned in the third docking field are displayed. These icons may be arranged and displayed according to the ancestral links with the icon/record positioned in the third docking field.

The method of displaying records and/or transitioning between records may additionally include linking the genealogical record associated with the first icon to a genealogical record associated with a third icon by positioning the third icon in one of the sibling fields, progeny fields, or ancestral fields to establish a respective sibling, progeny, or ancestral relationship with the genealogical record of the first icon.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Figure 1:
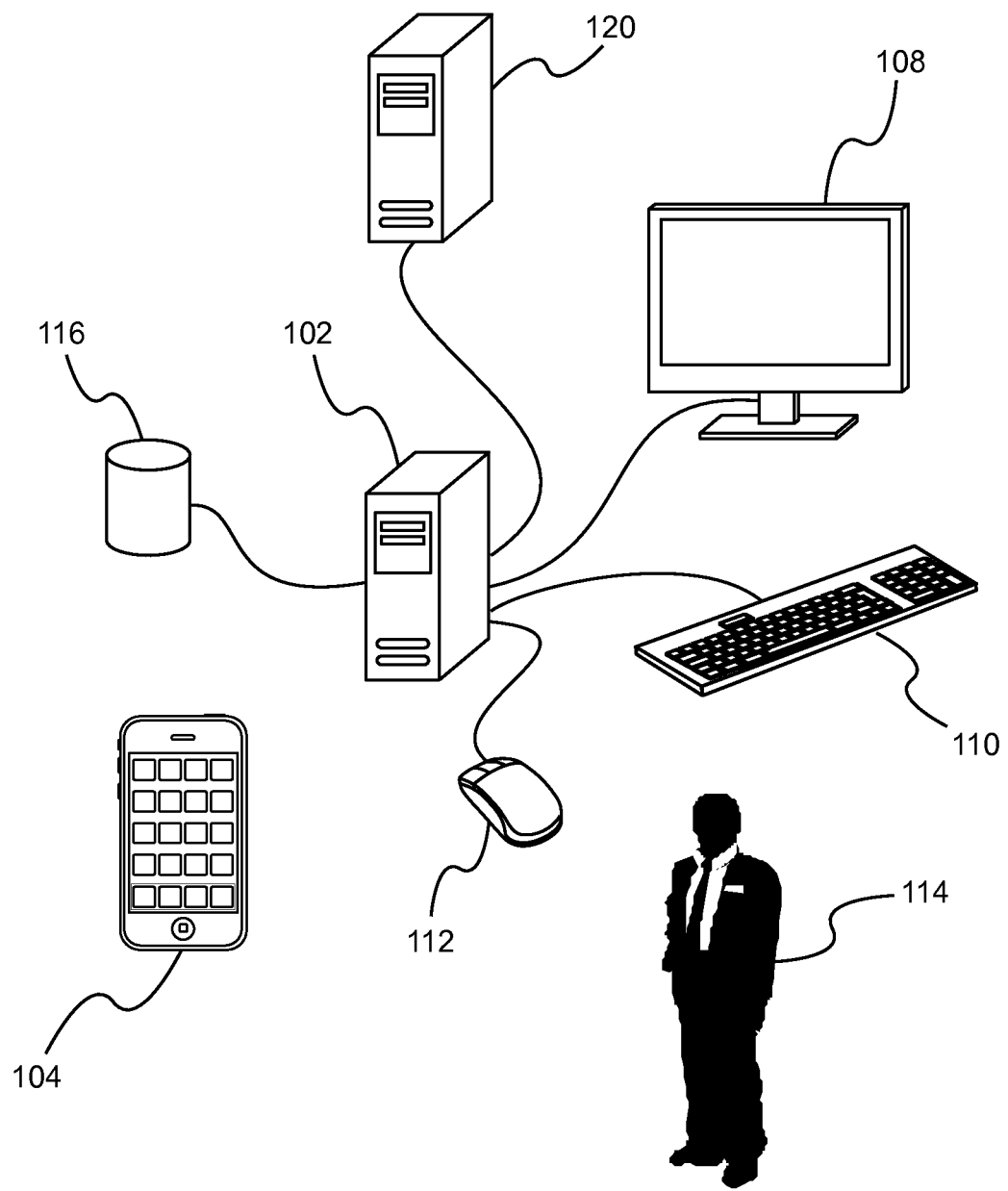
FIG. 1 is a simplified schematic of a system that may be used to display records according to an embodiment of the invention.

Turning now to FIG. 1, illustrated is a simplified schematic of a system that may be used to perform the methods and operations described herein. For example, the system may be used to run a record display program to display one or more icons or nodes associated with a record, such as a genealogical record and/or to seamlessly transition between displayed records and record views. The icons or nodes may be visual representations of a record that are displayed on a display device. In addition, the display of an icon or node with respect to the other displayed icons or nodes may visually represent relationship information (i.e., family associations) between the records.

The system may include a central computing system 102. The central computing system 102 may be any type of computer operated by an individual, such as a personal home computer, laptop, wireless device, etc., or may be a component of a larger computing system, such as a server operated by a corporation or company. In one embodiment, the central computing system 102 may include a communications interface (not shown), a processor (not shown), and/or a memory device (not shown), such as those described in FIG. 8 to perform the operations and methods described herein. For example, the central computing system 102 may receive inputs from a user 114, such as an input to display one or more icons/nodes associated with a record, and may communicate with a display device 108 to display the icons and/or transition between displayed icons.

According to one embodiment, the central computing system 102 may be communicatively coupled with an additional computing system 120 (e.g., a computer or server) so that the operations and methods described herein are performed over a network. For example, genealogical data and/or records and/or instructions to run a record display program may be stored at the additional computing system 120. Additional computing system 120 may provide this information to central computing system 102 over one or more networks so that a user 114 of central computing system 102 is able to display records and/or transition between displayed records and/or record views. According to another embodiment, a portion of a record display program may be run on central computing system 102 while another portion is run over a network from additional computing system 120. Further, the record display program may be run on a wireless device, such as a smart phone, and/or on a laptop, notebook, or tablet computing system.

Additional computing system 120 may be communicatively coupled with a database (not shown) that stores the record data (i.e., genealogical data), records, and/or instructions. Further, additional computing system 120 may be operated by one or more companies that provide record data services to remote users, such as providing searchable genealogical databases. The displays described herein may render such databases more searchable and/or more user friendly.

The central computing system 102 and/or additional computing system 120 may be communicatively coupled with various hardware. For example, FIG. 1 illustrates the central computing system 102 communicatively coupled with a database 116, a display device 108, a keyboard 110, a mouse 112, and a wireless device 104. The hardware components could be communicatively coupled with the central computing system 102 via a network and/or may be directly connected to the central computing system 102. Database 116 may be a remote database or may be internal to the central computing system 102. Database 116 may store information and/or instructions for performing the methods described herein. In addition, database 116 may store one or more records. The records may be any type of record including personal records, genealogical or ancestral records, company records, etc. Database 116 may be searchable so that individuals and/or entities can search for a record and/or for information from a record within database 116.

The display device 108 may be any type of device for displaying information to a user 114, such as an LCD display, a plasma display, a CRT display, etc. Display device 108 can display one or more records and/or one or more record views to a user 114, such as those described in FIGS. 2-6. Keyboard 110 and/or mouse 112 can allow the user 114 to provide input to the central computing system 102 and/or additional computing system 120. The input information may include a selection of one or more records to display, such as by selecting an icon associated with a record, and/or may include instructions to transition between records displayed on display device 108. The keyboard 110 and/or mouse 112 may also allow the user 114 to key in (i.e., type) information into a record and/or document.

Wireless device 104 may communicatively couple with central computing system 102 and/or additional computing system 120 to run a record display program and/or search one or more databases for a record. For example, the record display program may be run entirely on wireless device 104, but wireless device may couple with additional computing system 120, via a wired and/or wireless connection, to obtain genealogical data and/or records from additional computing system 120, which may be a server (e.g., API server), database, etc.

Figure 2:
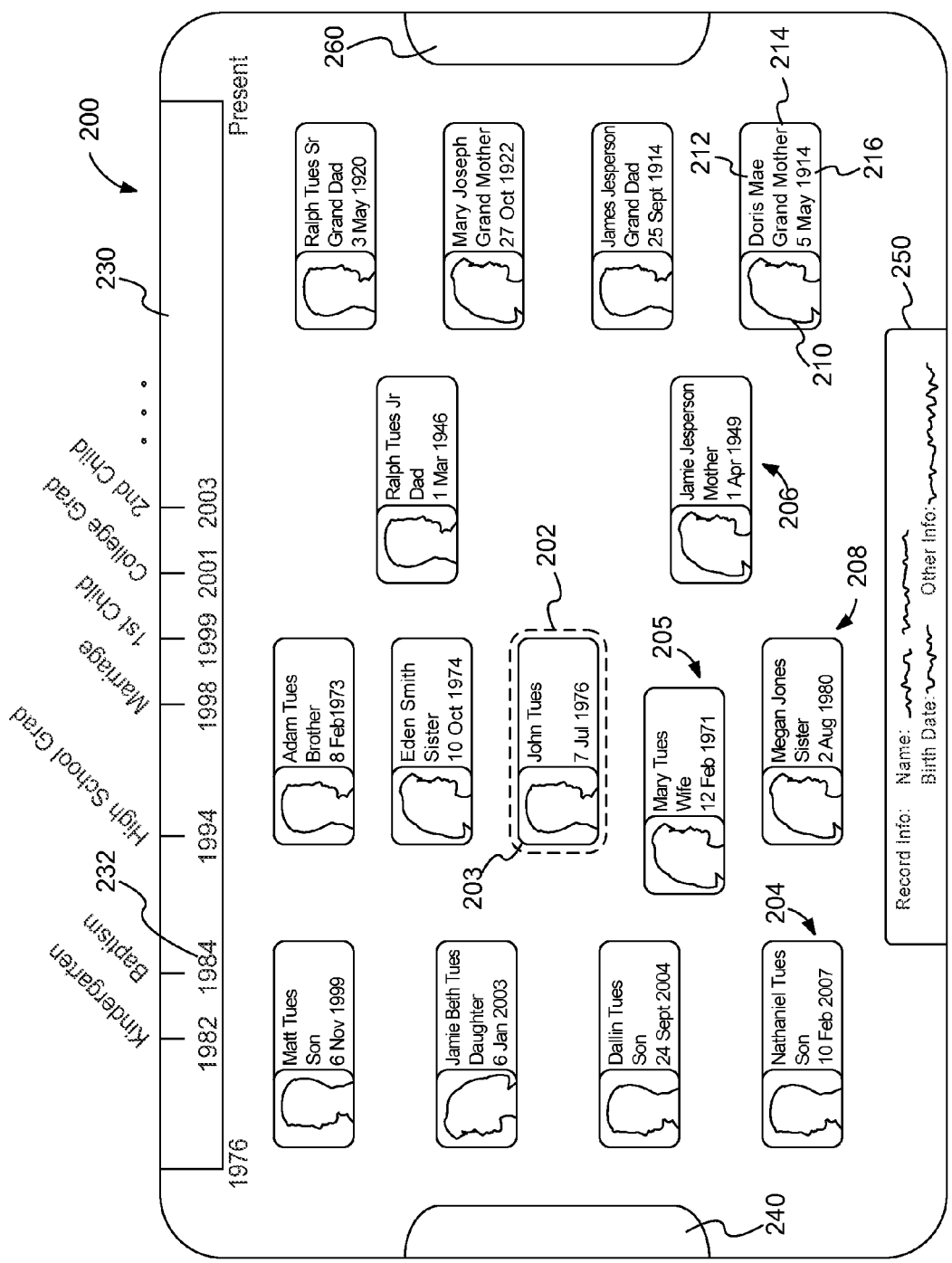
FIG. 2 is a display of an arrangement of icons corresponding to interrelated records according to an embodiment of the invention.

Turning now to FIG. 2, shown is a display 200 of a record display program illustrating an exemplary arrangement of icons or nodes corresponding to records that are interrelated.

The display 200 provides an easy and convenient way to show the relationships between records (i.e., show how the records are connected). Specifically shown in display 200 is a plurality of icons related to genealogical records, although the icons may correspond to any type of record. In the context of genealogical records, display 200 may be arranged according to a "relationship view," which simultaneously shows an individual's progeny, ancestry, and siblings. However, display 200 is not restricted to one type of view, such as an ancestral view that only shows a person's ancestors, but may show any and all relationships linked to an individual.

The display 200 may include a plurality of icons or avatars, such as icon/node 210. Each of the icons may be associated with a specific record in a database of records. Central computing system 102 and/or additional computing system 120 may associate each of the records with a specific icon 210 and/or a user can associate each record with an icon. The icon 210 may include a figure that visually represents the associated record. For example, the icons 210 displayed in FIG. 2 show a profile of a woman's head or a man's head to visually represent the sex of the individual associated with the genealogical record. The icons 210 may further be colored to show additional information, such as coloring icons representing females in pink and icons representing males in blue. The icons 210 may further include information about the record that they represent. For example, FIG. 2 illustrates icon 210 as including the name 212 and the birth date 216 information of the individual.

The display 200 may include a docking field 202 (shown in dashed lines) that focuses display 200 on a selected record and/or that displays relationship information for the selected record (e.g., displays a family relationship for the selected record). The docking field 202 may be a predefined area of the display that is configured to receive an icon and display information for the record positioned in the docking field 202. The display 200 may include a visually defined boundary for the docking field 202 or may generally include an area that a user recognizes as being the docking field 202. FIG. 2 illustrates icon 203 that represents a genealogical record for John Tues as being positioned within the docking field 202. Since this icon 203 is positioned within docking field 202, the display 200 is focused on the record for John Tues and the relationship or connectedness of other records linked to the record for John Tues. Thus, the other icons shown in display 200 are arranged according to their relationship or link with the icon 203 representing John Tues. More specifically, the other icons are arranged according to the relationship or link between the records they represent and the record of John Tues.

Display 200 may include one or more progeny or descendant fields 204 that are linked to the docking field 202. The progeny fields 204 may be configured to display the icons of genealogical records that are the progeny or descendants of the person associated with the record/icon 203 positioned in docking field 202. For example, FIG. 2 illustrates the progeny fields 204 disposed to the left side of docking field 202 and including 4 icons that represent the children of John Tues. The progeny icons may be arranged according to birth order with the icon for the oldest child vertically above the other icons and the icon for the youngest children vertically below the other icons. Display 200 may also include one or more spouse fields 205 linked to docking field 202 and configured to display the icon associated with the spouse(s) of the person represented by the icon 203 in docking field 202. The spouse filed may be positioned vertically below and slightly horizontally offset from icon 203 in docking field 202.

Display 200 may further include a plurality of sibling fields 208 that are linked to the docking field 202. The sibling fields 208 may be configured to display the icons of genealogical records that are the siblings of the person associated with the record/icon 203 positioned in docking field 202. The sibling fields 208 may be positioned vertically above and/or below the docking field 202 so that the icons displayed in the sibling fields 208 horizontally align with the icon in the docking field and are vertically offset from one another. The icons in the sibling fields 208 may be arranged according to a birth order so that the icon for the oldest sibling is positioned above the other icons and the icon for the youngest child is positioned below the other icons. Such an arrangement of siblings may visually illustrate where in the birth order the person represented by icon 203 fits within the family. For example, merely from the arrangement of icons in the sibling fields 208, a person can quickly discern that John Tues was the third of four children and the second of two boys.

Display 200 may additionally include a plurality of ancestral fields 206 that are likewise linked to docking field 202. The ancestral fields 206 may be configured to display the icons of genealogical records that are the ancestors of the person associated with the record/icon 203 positioned in docking field 202. The ancestral fields 206 may be positioned to the right of the docking field 202 so that the parent icons in each generation are horizontally offset from the corresponding child icon and vertically offset above and below the centerline of the child's icon as shown in FIG. 2.

Each of the icons, such as icon 210, may also include relationship information 214 that describes the relationship between an icon 210 and the icons 203 positioned in the docking field 202, or more specifically the relationship between the records represented by the icons, 210 and 203. As illustrated in display 200, the icons in the progeny fields indicate whether the individuals are sons or daughters of John Tues, while the icons in the sibling fields indicated whether the individuals are brother or sisters of John Tues, the icon in the spouse field indicates that the individual is the wife of John Tues, and the icons in the ancestral fields indicate whether the individual is the father, mother, grandfather, grandmother, etc. of John Tues. Also, the figure shown in icon 210 may change depending on the position of the icon in display 200 to further visually illustrate the relationship between the icons and underlying records. For example, when the icon is positioned in an ancestral or sibling field (206 or 208), the head profile of the icon may face right to show that the individual is an ancestor or sibling of the person represented in docking field 202, and when the icon is positioned in a progeny field 204, the head profile of the icon may face left to show that the individual is a descendant of a person represented in docking field 202.

Display 200 may further include a timeline 230 positioned at the top of display 200. The timeline 230 may include information that is specific or sensitive to the person represented by icon 203 positioned in docking field 202 and/or the timeline 230 may include information that is specific to the view shown in display 200. For example, the timeline 230 may change based on whether display 200 includes a relationship view as shown in FIG. 2 or a pedigree or ancestry view as described in FIGS. 5 and 6. The timeline 230 may include the dates 232 of important events for the person represented by icon 203, such as the date of birth, baptism, high school graduation, marriage, birth of a child, etc., and/or may include important world events. Alternatively or additionally, the timeline 230 may include dates that are relevant to all the icons and underlying records displayed on display 200, such as a timeline that displays the oldest and most recent dates for the time range represented by display 200.

The timeline 230 may include a plurality of selectable regions that display additional information about the event and/or that highlight icons or information displayed on display 200. Selecting a date may include clicking on a date with a mouse pointer, scrolling a finger along the timeline, or any other method. For example, the birth date may be selected by clicking on the date with a mouse pointer, whereupon the birth place, time, and any other information are provided. In addition, the icons of the children may be highlighted or enlarged as a user scrolls a finger along timeline 230 and encounters a child's birth date. The information may be brought to the center of the screen and/or a pop up window with the information may populate an area of display 200. Alternatively, if timeline 230 spans the entire time range for the displayed icons, each icon may be highlighted as an event (e.g., birth date) associated with the icon is encountered on the timeline 230.

Display 200 may further include an information box 250 that displays information about one or more records. For example, the information box 250 may by default display information about the record of icon 203 positioned in docking field 202. The information may be changed as other records are selected or as events are selected from timeline 230. For example, if a father or grandfather record is selected by clicking on that record with a mouse pointer or finger, the information box 250 may display information about that individual. The information displayed may include the individual's name, genealogical record number, birth date, and/or any other information.

Display 200 may further include an ancestral docking field 240 that is configured to receive an icon and/or may include a progeny or descendant docking field 260 that is likewise configured to receive an icon. Positioning or placing an icon in one of these docking fields, 240 or 260, may change the view displayed on display 200 from the relationship view shown in FIG. 2 to an ancestry view or descendant view, such as those described in FIGS. 5 and 6. Thus, using these three docking fields (i.e., docking field 202, docking field 240, and docking field 260) a user can quickly and conveniently alternate between a relationship view, an ancestry view, and a descendant view and thereby quickly receive additional information about a record and/or a different perspective of that record's relationship with other records.

Further, although FIG. 2 shows the ancestral fields 206 running two generations deep and the progeny fields 204 running one generation deep, it should be realized that the fields and/or icons may be arranged in any configuration. For example, the ancestral fields 206 may run one generation deep while the progeny fields 204 run three generations deep, or the ancestral fields 206 and progeny fields 204 may both run two or three generations deep. Further, the docking field 202 may be repositionable on the display 200 so that a user may reconfigure the display 200 according to need and/or preference. For example, a user may enlarge the area defined for docking field 202 and or reposition it vertically and/or horizontally on the display 200. Additionally, records may be linked together in display 200 by positioning an icon associated with a record into one of the progeny, sibling, or ancestral fields. For example, a user may drag an icon from an area adjacent display 200 and position the icon in a grandparent field to link the underlying record with the record of the icon 203 positioned in docking field 202 and further link the underlying record with all the other records represented in display 200. Linking records may include a keystroke, mouse click, or some other indicator that signals a system or program (e.g., central computing system 102) to link the records together.

Figure 3:
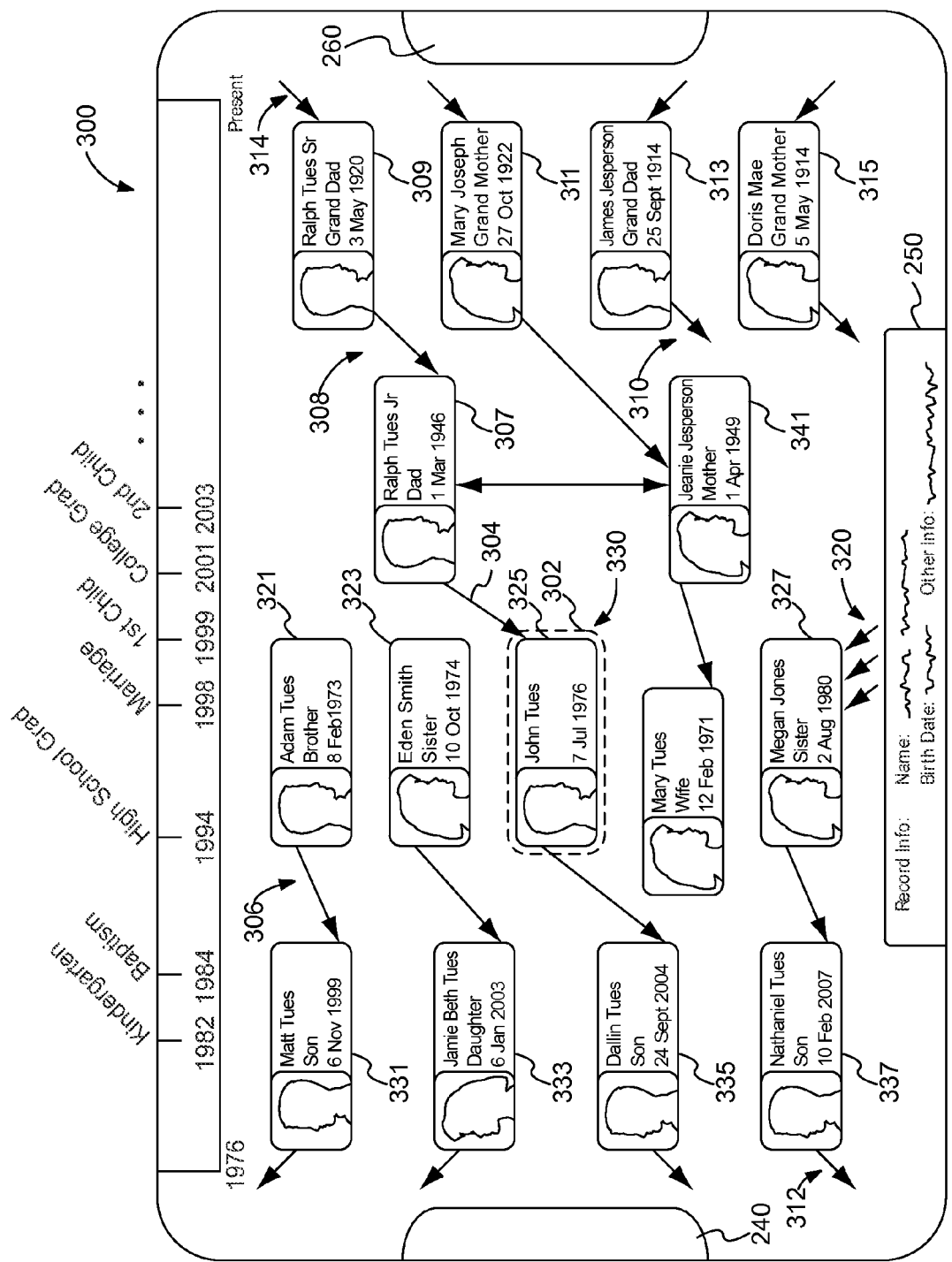
FIG. 3 is a display illustrating a transfer or transition of icons from one field to another according to an embodiment of the invention.
Figure 4:
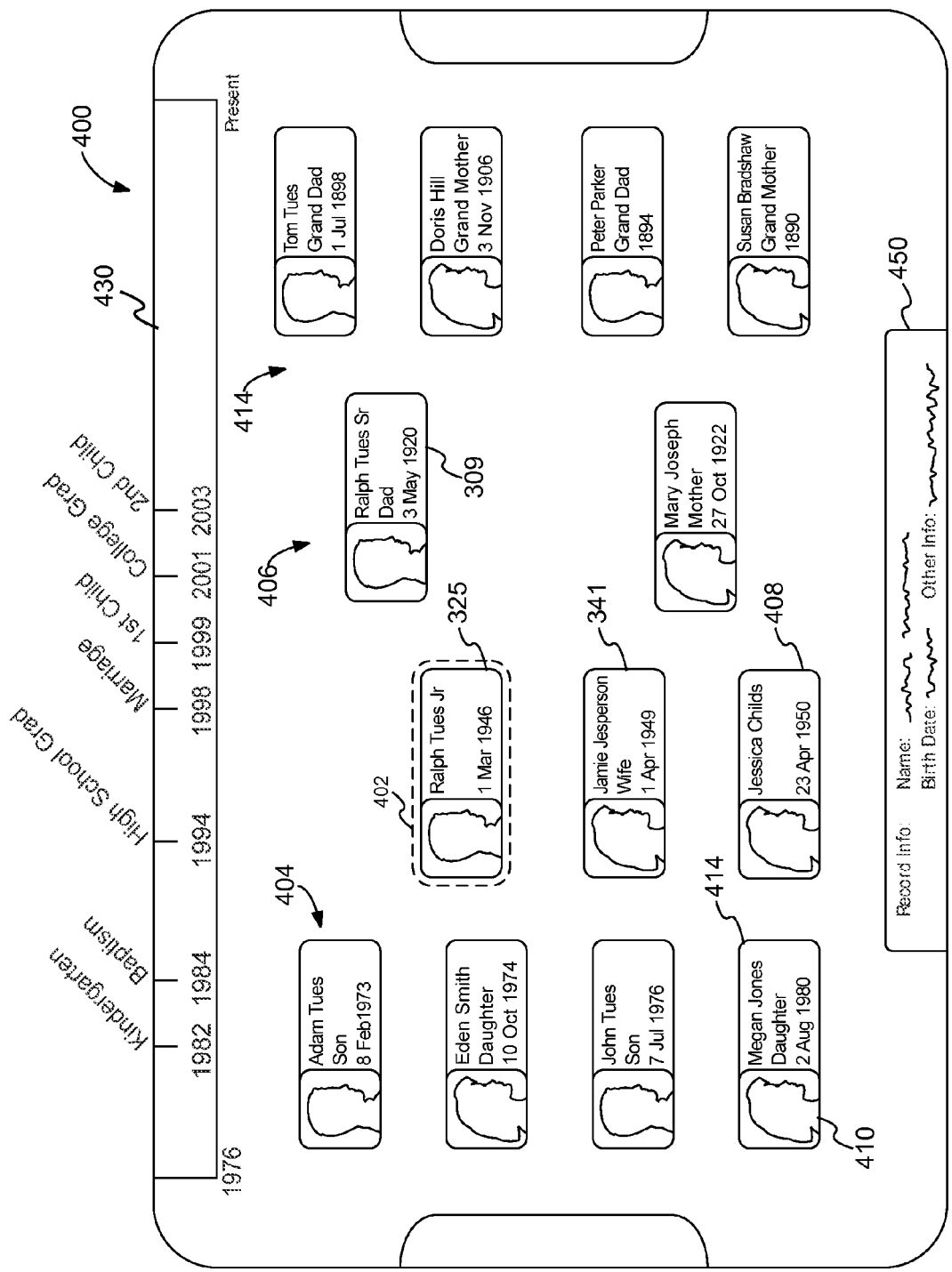
FIG. 4 is a display illustrating repositioned icons after a transfer or transition of icons according to an embodiment of the invention.

Turning now to FIGS. 3 and 4, illustrated is a display 300 showing a transfer or transition of icons or nodes from one field to another and a display 400 showing the repositioned icons or nodes after the transfer or transition occurs. Specifically, FIG. 3 illustrates a transition of icons/nodes that occurs as a single icon is transferred into or out of docking field 302. The display 300 allows a user to quickly select between or scroll between records to change the focus of display 300 by repositioning icons within docking field 302, or in other words, to change the focus of display 300 by replacing the icon in docking field 302 with another icon. The transition or transfer of icons may occur such that the context of the relationships between the records is maintained.

One way to keep the relationship context intact is to transition or transfer all the icons simultaneously or nearly simultaneously so that it appears to a user that all the icons transfer/shift at once while maintaining a linked arrangement. Maintaining a linked arrangement may include maintaining spatial dimensions between icons so that it appears as if the icons are physically linked together. Another way to keep the relationship context intact is to transfer, transition, or otherwise shift and move icons without refreshing or redrawing display 200, which helps keep the focus and attention on the icons and relationships between icons/records. The transfer or replacement of an icon in docking field 302 changes the focus of the information and relationships in display 300 from the record for the transferred or replaced icon to the record for the new icon. For example, the sibling, ancestral, and/or progeny links may change and/or the timeline information may change to reflect the shift in focus to the new icon positioned in docking field 302.

FIG. 3, specifically illustrates icon 307 associated with the record for Ralph Tues Jr. being transferred from the ancestral field (specifically the father field) into docking field 302. The arrow corresponding to element 304 illustrates the transfer of icon 307 from the father field to docking field 302. As icon 307 transfers into docking field 302, the other icons in display 300 may transfer into one or more fields based on the relationship between the records of these icons and the record of icon 307, which is now the focus of display 300. For example, icons 309 and 311, which represent the respective father and mother records of Ralph Tues Jr. (icon 307) may transfer from grandfather and grandmother fields to father and mother fields based on a father and mother relationship with the record represented by icon 307 (this transfer is illustrated by the arrows corresponding to element 308). FIG. 4 illustrates icons/nodes 309 and 311 repositioned in the father and mother fields 406, respectively. The icons, 309 and 311, may appear to move simultaneously with or near simultaneously with icon 307 so that the context of the relationship is maintained.

Similarly, icons 321, 323, 325, and 327 may transfer from the siblings fields and docking field, respectively, to the progeny fields due to these icons representing the children of the Ralph Tues Jr. represented by icon 307 (this transfer is illustrated by the arrows corresponding to element 306). Likewise, icon 325 representing John Tues may transition out of the docking field 302 so that the focus of display 300 is shifted from the record of John Tues to the record of Ralph Tues Jr., or any other record that is positioned within docking field 302. FIG. 4 illustrates the icons of the sibling fields and docking field of FIG. 2 repositioned in the progeny fields 404. Further, FIG. 4 shows that the FIG. 410 of an icon (in this case the profile of a woman's head of the record for Megan Jones) may change as the icon transfers between fields and/or is repositioned on display 400. Specifically, the head profile 410 of the icon representing Megan Jones has switched from facing right as shown in FIG. 2, to facing left to visually illustrate that the icon is now positioned in a progeny field 404. Likewise, the relationship information 414 may be updated to reflect the record's relationship to the record of the icon 307 newly positioned in docking field 402. This update reflects the change in focus of the display 400 from the record of John Tues to the record of Ralph Tues Jr. FIG. 4, illustrates the relationship information for all the icons being updated to reflect the changed focus. As previously described, icons 321, 323, 325, and 327 may transfer or transition simultaneously with or nearly simultaneously with icon 307 so that the transition is visually seamless or substantially visually seamless to a user and the context of the relationship is maintained.

As the focus of display 300 shifts from the record of icon 325 to the record of icon 307, one or more records may be transitioned or transferred off display 300. For example, icons 331, 333, 335, and 337 may be transferred from the sibling fields so that the icons are no longer visible on display 300 (this transfer is illustrated by the arrows corresponding to element 312 and illustrated in FIG. 4, which shows display 400 without these icons). This may be due to the user configuring display 300 to only display one generation of descendants. Similarly, icons 313 and 315, which represent the father-in-law and mother-in-law of the record of icon 307 may be transferred from the ancestral fields so that these records are no longer displayed because the relationship of these records to the record of icon 307, as defined by the user, is too tenuous for display (this transfer is illustrated by the arrows corresponding to element 310). For example, the user may configure the display 300 to only display blood line relatives. Of course, the display 300 could be configured to display in law relatives if desired.

Icons representing records that were not originally displayed in FIG. 2 may be transferred or transitioned onto display 300. For example, the arrows corresponding to element 314 show the grandparent records linked to the record of icon 307 being transferred onto display 300 so that the previously un-displayed grandparent icons are subsequently displayed. FIG. 4 illustrates the previously un-displayed icons repositioned in the grandparent fields 414. Likewise, the arrows corresponding to element 320 show that the sibling records corresponding to icon 307 are transferred onto display 300 in a similar fashion and FIG. 4 illustrates the previously un-displayed icon repositioned in the sibling field 408. These un-displayed icons, thus, are transferred onto display 300 and subsequently populate the respective fields (sibling and ancestral) based on their relationship to the record of icon 307. Further, all the icons may transfer to new fields and/or on or off display 300 simultaneously or nearly simultaneously to provide a visually seamless transition and thereby keep the relationships between the records in context during the transition. Additionally, display 300 may curve toward the edges of the display so that icons transferred on and/or off display 300 curve behind one another toward the edge of the display thereby enabling several generations of icons to be visible toward the display's 300 edge.

Additionally, the icons displayed in display 300 may be arranged and/or positioned based on positioning an icon in one of the sibling, progeny, or ancestral fields. For example, icon 307 may be dragged from the ancestral fields into a progeny or sibling field. The icons of related records may transfer simultaneously with icon 307 so that some or all of the fields are populated with an icon when the transfer of icon 307 is completed. Any unpopulated fields may be populated upon completion of or during the transfer. Since icon 307 is dragged into a field other than the docking field 302, the central computing system 102 or other device upon which display 300 is displayed may determine which icon to populate in docking field 302 or the docking field 302 may be populated with the nearest displayed icon when the transfer is complete. In this way, the focus of the display 300 may be changed without dragging or scrolling an icon into docking field 302.

Transferring icons may occur in a variety of ways, such as through scrolling, selecting and dragging an icon, moving an imaging device such as wireless device 104, etc. For example, a user may use a scroll button to scroll between records displayed in docking field 302 or may place a finger and/or mouse pointer on a display device (e.g., a selectable LCD screen) and scroll through records displayed in docking field 302 by dragging the finger and/or mouse pointer across the display device. The user may move a finger and/or mouse pointer vertically as well as horizontally to navigate between records, such as by dragging a finger diagonally up and right to transfer icon 307 to docking field 302 or by dragging a finger diagonally down and right to transfer icon 341 to docking field 302. In this manner, a user may quickly and conveniently scroll through numerous records and across multiple generations (forward and backward) without lifting a finger or by merely positioning a mouse pointer. If the record database is large, the user may further quickly and conveniently scroll horizontally through multiple generations and scroll vertically through multiple family lines so that the displayed record at the end of the scrolling session is tenuously related to the record displayed at the beginning of the scrolling session.

In addition to scrolling, the user can position icons in the docking field 302 by selecting an icon from one of the fields and dragging the icon to the docking field 302. For example, the arrow corresponding to element 330 illustrates that icon 309 representing Ralph Tues Sr. may be selected and dragged from the grandfather field to the docking field 302 so that the focus of the display 300 is transferred to the record of icon 309. The transfer or transition of the icons between fields and/or on or off the display 300 may occur simultaneously or near simultaneously as described above.

Similarly, the display device may be configured to recognize a position change of the display device to allow a user to navigate between records by physically moving the display device. For example, if the display 300 is displayed on a wireless device 104, a user may move the wireless device vertically and/or horizontally to navigate between the icons positioned in the docking field 302. The icons may appear fixed in space and the icons move on or off the display as the wireless device 104 is moved. Such a configuration is similar to moving a transparent piece of glass and viewing icons behind the glass, where the icons remain fixed in space, but they enter or exit the glass display as the glass is moved in relation to the icons.

Further, although FIG. 3 has been described as transferring or transitioning an icon from an ancestral field into the docking field 302, it should be realized that an icon can be transferred into the docking field 302 from any field of display 300 and/or from an area off display 300. For example, an icon in a sibling field or progeny field may be transferred to the docking field 302 to focus the display 300 on the sibling record or descendant/progeny record. Thus, display 300 is capable of moving in any direction (horizontal, vertical, diagonal) through a genealogical record. Similarly, the docking field may be selected, which may open a browse window so that a user can select a record and icon to display in docking field 302.

Further, timeline 330 and or information box 350 may show various pieces of information as icons and records are being transferred. For example, the timeline may show a scrolling timeline representing the range of the generations displayed so that as the user scrolls or transitions between records, the timeline provides a context of the time period represented. In addition, dynamically transitioning between records and updating displays (i.e., record views) may expose gaps in record databases. For example, scrolling between records may reveal that two records are linked as grandparent and grandchild without having a parent record in between. This gap may show up as a blank space. Further, scrolling between records may expose areas that need to be explored to make sure the record is complete. For example, if a sibling field for a family in the 1800s includes only a single record/icon, this may indicate that the record is incomplete because small families were more uncommon then.

Figure 5:
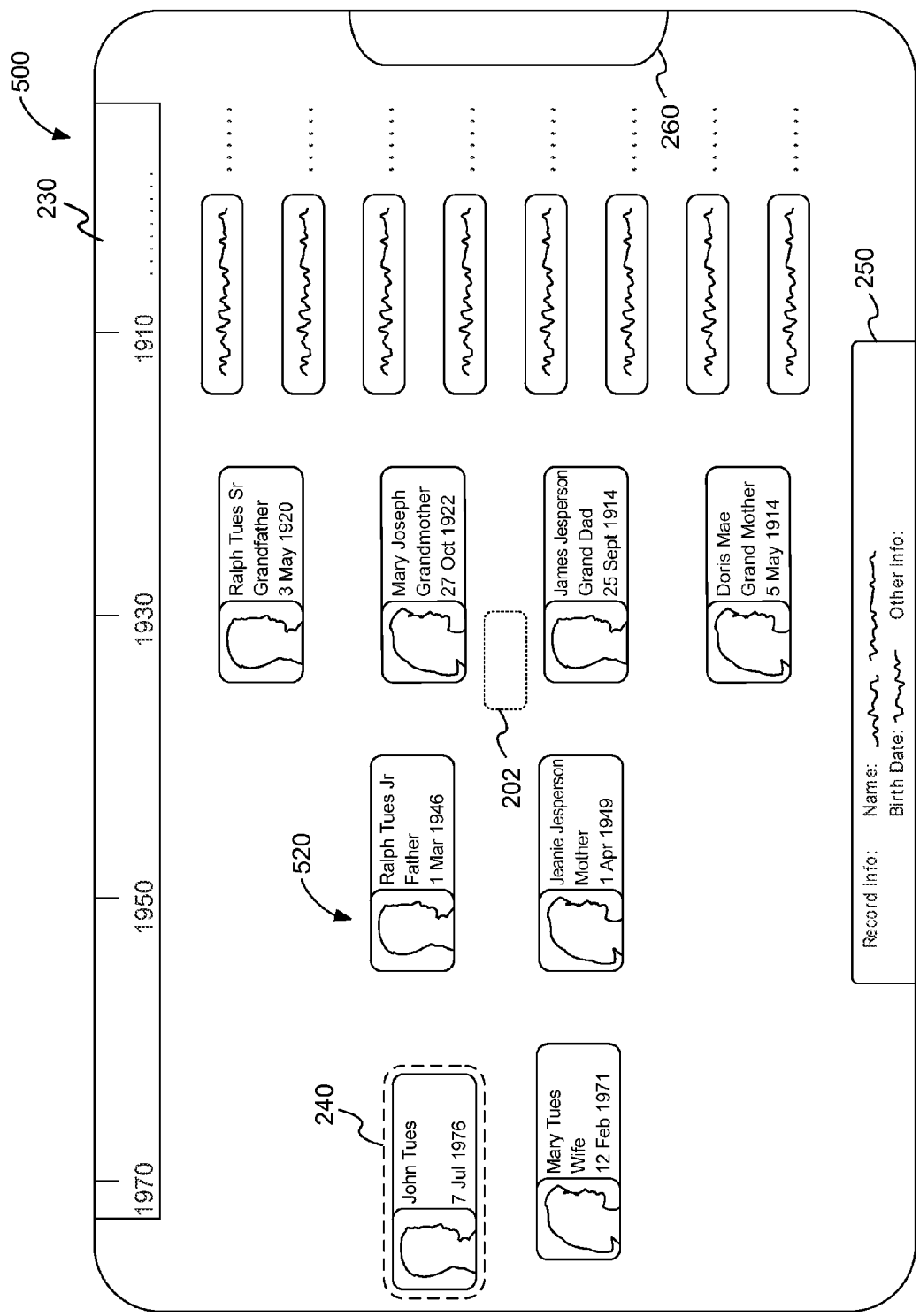
FIG. 5 is a display illustrating a transition of a view to an ancestry view according to an embodiment of the invention.
Figure 6:
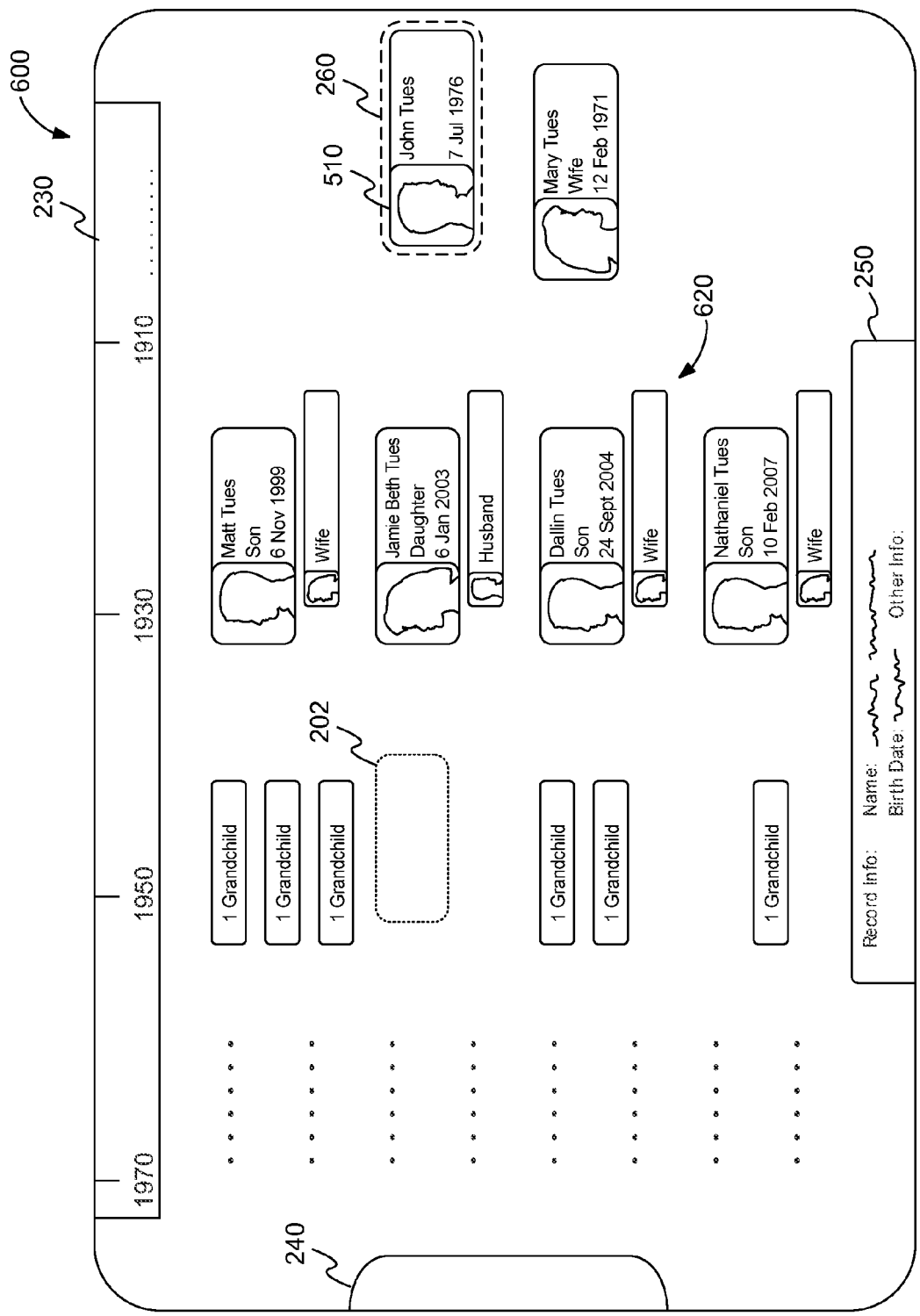
FIG. 6 is a display illustrating a transition of a view to a descendant view according to an embodiment of the invention.

Turning now to FIGS. 5 and 6, illustrated in FIG. 5 is a display 500 showing a transition of a display to an ancestry view; similarly, illustrated in FIG. 6 is a display 600 showing a transition of a display to a descendant view. The transition between views (ancestry or descendant) may occur by positioning an icon/node within ancestry docking field 240 or descendant docking field 260. For example, as shown in FIG. 5, icon 510 associated with John Tues may be selected and dragged from docking field 202 into ancestry docking field 240, whereupon the record view of display 500 changes from a relationship view as described in FIG. 2 to an ancestry view that shows icons for the ancestors of John Tues. Likewise, as shown in FIG. 6, icon 510 may be selected and dragged from docking field 202 into descendant docking field 260, whereupon the record view of display 600 changes from a relationship view to a descendant view that shows icons for the descendants of John Tues. The icons may also be dragged between ancestry docking field 240 and descendant docking field 260 to directly transition between ancestry and descendant views. These views provide relationship information for a record from different historical and visual perspectives and provide a quick way to transition between views.

Further, all the icons may transfer between views simultaneously or nearly simultaneously as described above so that the transition between views is visually seamless and the visual link between records remains intact. Additionally, transferring or docking an icon in ancestry docking field 240 and/or descendant docking field may involve pressing a function key, clicking or doubling clicking a mouse key, dragging the icon into a sensitive area, or some other signal that indicates a record display program to dock an icon in the docking field. As described previously, ancestry docking field 240 and/or descendant docking field 260 may be defined areas of display 500 and/or 600 that recognize when an icon is positioned within the docking field.

The icons displayed in ancestry view of display 500 are generally all positioned in ancestral fields 520, although the display 500 may also include one or more icons in the sibling fields (FIG. 5 shows the record of Mary Tues positioned in a spouse field). The display 500 may also include a timeline 230 and/or information box 250 as previously described. The timeline 230 may show a timeline of the time range of the records and icons displayed in display 500. Scrolling along timeline 230 may highlight one or more records or pieces of information as specific dates are encountered. Alternatively, timeline 230 may show a timeline of one or more selected records. FIG. 5 shows four generations of records being displayed, although display 500 may be configured to show more or less generations than this.

The icons displayed in descendant view of display 600 are generally all positioned in progeny fields 620, although display 600 may likewise include one or more icons in the sibling fields (FIG. 6 shows the record of Mary Tues positioned in a spouse field). The progeny fields 620 may also include spouse fields to display the spouses of the descendants. Further, the number of generations displayed may be configured or selected by the user so that virtually any number of generations are displayed. FIG. 6 illustrates three generations being displayed, which include children and grandchildren progeny fields. Further, FIGS. 5 and 6 show that the head profile of the icons may change from right facing to left facing depending on the fields the icons are positioned in and/or depending on the relationship of the records to the record of icon 510. Display 600 may further include a timeline 230 and/or information box 250. Timeline 230 may include a time range and/or any other information as previously described.

Figure 7:
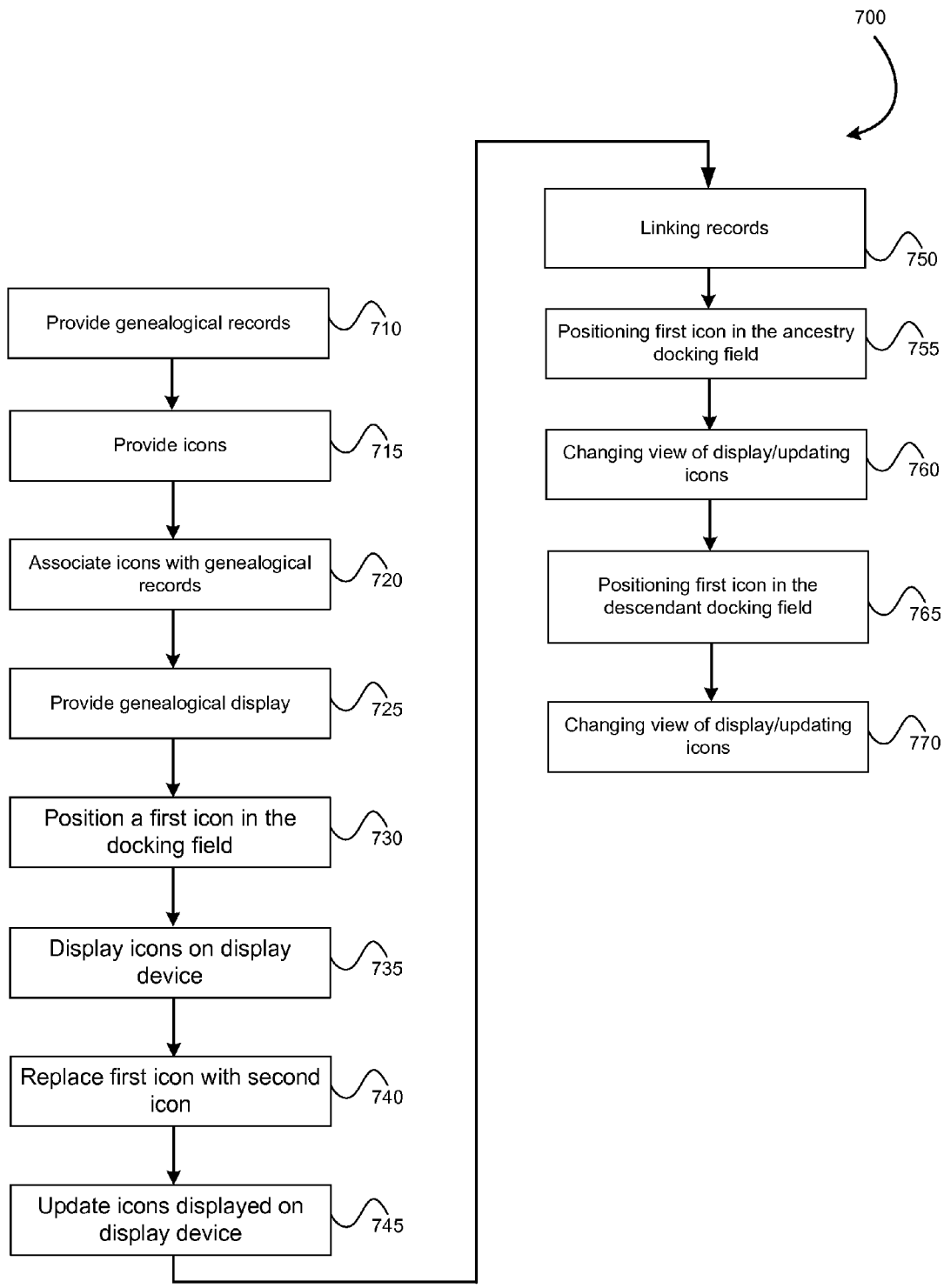
FIG. 7 is a flow diagram illustrating a method of displaying records and/or transitioning between record displays or views according to an embodiment of the invention.

Turning now to FIG. 7, illustrated is a flow diagram of a method of displaying records and/or transitioning between record displays or view. The method may be performed on central computing system 102 or over a network from additional computing system 120 or may be performed by a single device, such as wireless device 104 or a tablet computing device. At block 710 a plurality of genealogical records may be provided, such as by storing genealogical records on a database or receiving records from a user. At block 715, a plurality of icons may be provided. At block 720, the icons may be associated with the genealogical records so that each or most record are represented by an icon.

At block 725, a genealogical display may be provided. The genealogical display may include a docking field and a plurality of progeny fields, sibling fields, and/or ancestral fields as described above in relation to FIG. 2. Each of the fields may be configured to receive and display icons of genealogical records. At block 730, a first icon associated with a first record may be positioned in the docking field. At block 735, the first icon and/or information about the first record may be displayed on a display device. In addition, the icons of records linked to the first record may be displayed in the appropriate sibling, progeny, or ancestral fields based on the relationship between the linked records and the first record.

At block 740, the first icon positioned in the docking field may be replaced with a second icon associated with a second record by scrolling between the icons and/or selecting and dragging the second icon from one of the fields (sibling, progeny, or ancestral) into the docking field. At block 745, the icons displayed on the display device may be updated to reflect the change in focus of the display from the first record to the second record. Updating the icons may include seamlessly transferring or transitioning the icons of the linked records from the sibling, progeny, or ancestral fields to new fields (or on or off the display) based on the relationship between the linked records and the second record. All or a majority of the displayed icons may be transferred or transitioned simultaneously or near simultaneously so that the icons appear to move in unison to thereby maintain the relationship context between icons and records.

At block 750, a third record represented by a third icon may be linked with the records represented by the displayed icons by positioning the third icon in a field representing the relationship of the third record with the other records, such as by positioning the third icon in a sibling field to form a sibling link with the second icon positioned in the docking field. The third record may similarly be linked with some or all the records in a genealogical database based on positioning the third icon in one of the fields.

At block 755, the first icon may be positioned in the ancestry docking field. At block 760, the view of the display may be changed from a relationship or descendant view to an ancestry view and/or the icons in the display may be updated so that the icons for records ancestrally linked with the first icon are displayed according to the ancestral links. At block 765, the first icon may be positioned in the descendant docking field. At block 770, the view of the display may be changed from a relationship or ancestry view to a descendant view and/or the icons in the display may be updated so that the icons for records progenically linked with the first icon are displayed according to the progenical or descendant links.

Figure 8:
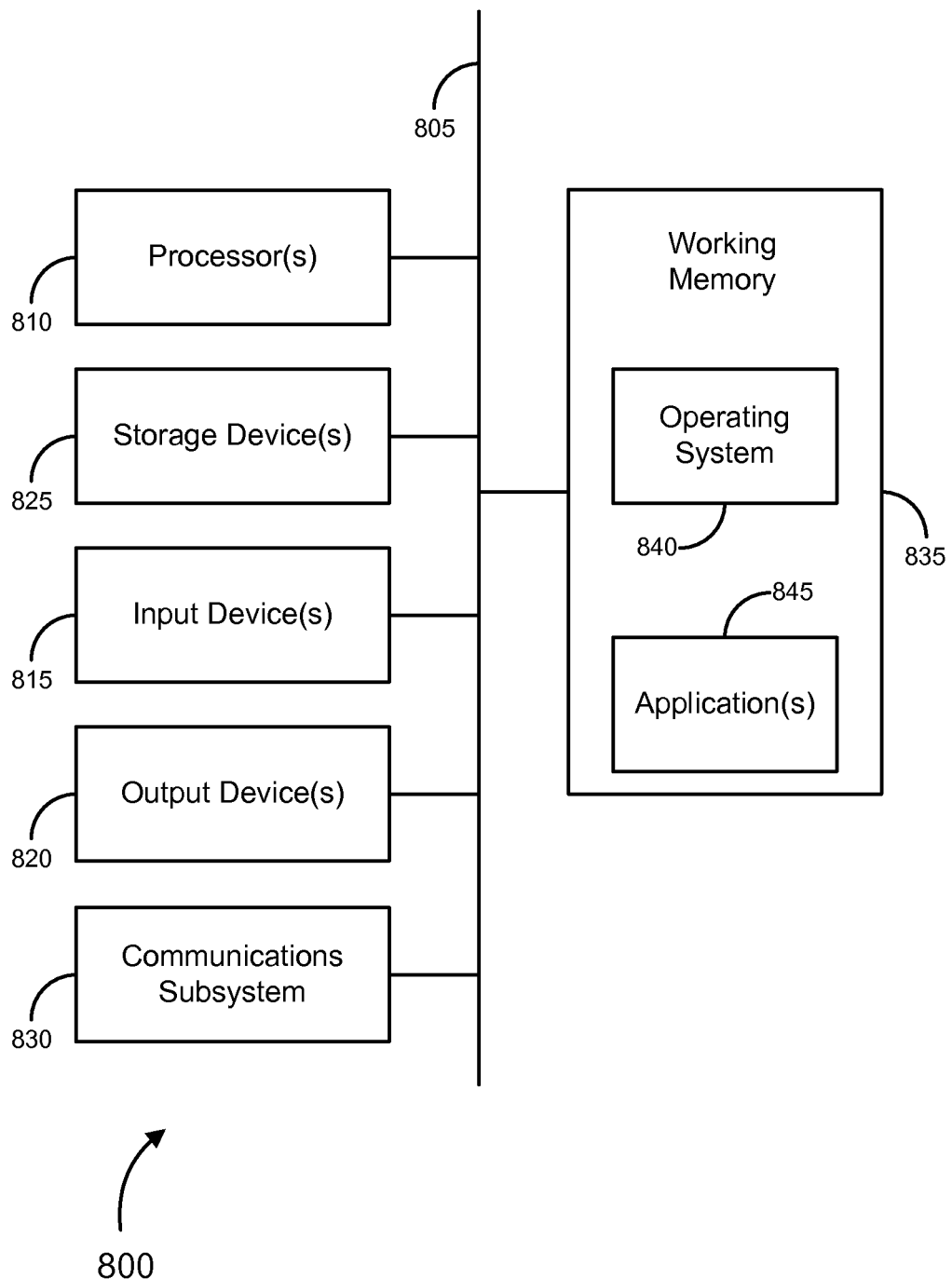
FIG. 8 is a schematic of a computer system that can perform the methods and/or processes described herein according to an embodiment of the invention.

With reference to FIG. 8, illustrated is a schematic of one embodiment of a computer system 800 that can perform the methods of the invention, as described herein. For example, the computer system can function as a system or device to display records and/or transition between record displays or views as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard and/or the like; and one or more output devices 820, which can include, without limitation, a display device, a printer and/or the like.

The computer system 800 may further include (and/or be in communication with) one or more storage devices 825, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network, and/or any other devices described herein. In many embodiments, the computer system 800 will further comprise a working memory 835, which can include a RAM or ROM device, as described above.

The computer system 800 can also comprise software elements, shown as being currently located within the working memory 835, including an operating system 840 and/or other code, such as one or more application programs 845, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s)

825 described above. In some cases, the storage medium might be incorporated within a computer system, such as the system 800. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium," "computer-readable medium," and "computer-readable storage medium," as used herein, refer to any medium that participates in providing data that causes a machine to operate in a specific fashion. In an embodiment implemented using the computer system 800, various machine-readable media might be involved in providing instructions/code to processor(s) 810 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 825. Volatile media includes, without limitation, dynamic memory, such as the working memory 835. Transmission media includes coaxial cables, copper wire, and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc., carried by the signals) to the working memory 835, from which the processor(s) 805 retrieves and executes the instructions. The instructions received by the working memory 835 may optionally be stored on a storage device 825 either before or after execution by the processor(s) 810.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for displaying information associated with genealogical records, the system comprising:

a computer processor; and a storage memory coupled with the computer processor, the storage memory including a set of instructions stored thereon which, when executed by the computer processor, cause the computer processor to implement the steps including:

storing a plurality of genealogical records;

providing a plurality of icons;

associating each genealogical record with an icon of the plurality of icons;

providing a genealogical display comprising:

a docking field comprising a pre-defined area within the genealogical display and configured to receive a single icon, wherein when an icon is positioned in the docking field, information about the genealogical record associated with the icon is displayed on a display device;

a plurality of progeny fields linked to the docking field and configured to display icons of genealogical records linked to the genealogical record of the icon positioned in the docking field according to a progeny relationship;

a plurality of ancestral fields linked to the docking field and configured to display icons of genealogical records linked to the genealogical record of the icon positioned in the docking field according to an ancestral relationship;

a plurality of sibling fields linked to the docking field and configured to display icons of genealogical records linked to the genealogical record of the icon positioned in the docking field according to a sibling relationship; and a timeline pertaining to the icon positioned in the docking field;

positioning a single icon in the docking field; and displaying simultaneously in a view on the display device:

the icon positioned in the docking field;

the information about the genealogical record associated with the icon in the docking field;

the icons of linked genealogical records in the respective sibling fields, progeny fields, and ancestral fields based on the respective relationships between the linked genealogical records and the genealogical record of the icon positioned in the docking field; and on the timeline, continuously selectable timeline information of events for the genealogical record and associated with the icon positioned in the docking field, with at least one of the events in the selectable timeline information also associated with at least one of the displayed icons of linked genealogical records, the at least one of the icons being different than the icon positioned in the docking field;

wherein, upon selection of the at least one of the events of the selectable timeline information of events as a user slides along the timeline and encounters the at least one of the events, the at least one of the displayed icons is highlighted among displayed icons of linked genealogical records, and wherein the steps further include:

replacing the icon positioned in the docking field with a different icon associated with a different genealogical record; and updating the icons displayed in the docking field, the progeny fields, the sibling fields, and the ancestral fields without shifting focus from the icons displayed on the display device;

wherein replacing the icon in the docking field comprises scrolling between displayed icons so that a displayed icon in one of the progeny fields, sibling fields, and ancestral fields adjacent the docking field replaces the icon in the docking field during scrolling.

2. The system according to claim 1, wherein updating the icons comprises transferring the icon of a linked genealogical record from one of the progeny fields, sibling fields, and ancestral fields to a new field based on the relationship between the icon and the different icon positioned in the docking field, wherein the transition is substantially visually seamless to a user of the system.

3. The system according to claim 1, wherein the docking field comprises a first docking field, wherein the genealogical display further comprises a second docking field separate from but in the same view as the displayed first docking field, displayed icons of linked genealogical records, and displayed timeline, wherein positioning an icon in the second docking field comprises selecting and dragging the icon to the second docking field on the display and wherein positioning the icon in the second docketing field changes the view on the display device to display the icons of genealogical records progenically linked with the genealogical record of the icon positioned in the second docking field, and wherein the icons are arranged according to the progenical link and without displaying the icons of records ancestrally linked with the genealogical record of the icon positioned in the second docking field.

4. The system according to claim 1, wherein the docking field comprises a first docking field, wherein the genealogical display further comprises a third docking separate from but in the same view as the displayed first docking field, displayed icons of linked genealogical records, and displayed timeline, wherein positioning an icon in the third docking field comprises selecting and dragging the icon to the third docking field on the display and wherein positioning the icon in the second docketing field changes the view on the display device to display the icons of genealogical records ancestrally linked with the genealogical record of the icon positioned in the third docking field, and wherein the icons are arranged according to the ancestral link and without displaying the icons of records progenically linked with the genealogical record of the icon positioned in the second docking field.

5. A method for transitioning between genealogical records displayed on a display device comprising:

providing a plurality of genealogical records;

providing a plurality of icons;

associating each genealogical record with an icon of the plurality of icons;

providing a genealogical display comprising:

a docking field comprising a pre-defined area within the genealogical display and configured to receive a single icon, wherein when an icon is positioned in the docking field, information about the genealogical record associated with the icon is displayed on the display device;

a plurality of progeny fields linked to the docking field and configured to display icons of genealogical records linked to the genealogical record of the icon positioned in the docking field according to a progeny relationship;

a plurality of ancestral fields linked to the docking field and configured to display icons of genealogical records linked to the genealogical record of the icon positioned in the docking field according to an ancestral relationship; and a plurality of sibling fields linked to the docking field and configured to display icons of genealogical records linked to the genealogical record of the icon positioned in the docking field according to a sibling relationship; and a timeline pertaining to the icon positioned in the docking field;

positioning a first, single icon in the docking field;

displaying simultaneously in a view on the display device: the first icon in the docking field; the information about the genealogical record associated with the first icon; the icons of linked genealogical records in the sibling fields, progeny fields, and ancestral fields based on the respective relationships between the linked genealogical records and the genealogical record associated with the first icon; and continuously selectable timeline information of events at the timeline pertaining to the genealogical record associated with the first icon, with at least one of the events in the selectable timeline information also associated with at least one of the displayed icons of linked genealogical records, the at least one of the icons being different than the icon positioned in the docking field; wherein, upon selection of the at least one of the events of the selectable timeline information of events as a user slides along the timeline and encounters the at least one of the events, the at least one of the displayed icons is highlighted among displayed icons of linked genealogical records;

replacing the first icon in the docking field with a second, single icon;

updating the icons displayed in each of the docking field, the progeny fields, the ancestral fields, sibling fields and the timeline, without shifting focus from the displayed icons;

wherein replacing the icon in the docking field comprises scrolling between displayed icons so that a displayed icon in one of the progeny fields, sibling fields, and ancestral fields adjacent the docking field replaces the icon in the docking field during scrolling.

6. The method according to claim 5, further comprising linking the genealogical record associated with the first icon to a genealogical record associated with a third icon by positioning the third icon in one of the plurality of sibling fields, progeny fields, and ancestral fields based on a respective relationship between the genealogical records.

7. The method according to claim 5, wherein updating the icons comprises transferring each of the icons of the linked genealogical records from the respective progeny fields, sibling fields, and ancestral fields to respective new fields based on the relationship between the each of the icons and the second icon, wherein the transfer of each of the icons is substantially visually seamless to a user.

8. The method according to claim 7, wherein the transfer of each of the icons occurs substantially simultaneously.

9. The method according to claim 5, wherein the docking field comprises a first docking field, wherein the genealogical display further comprises a second docking field separate from but in the same view as the displayed first docking field, displayed icons of linked genealogical records, and displayed time line, wherein positioning the first icon in the second docking field comprises selecting and dragging the icon to the second docking field on the display and wherein positioning the icon in the second docketing field changes the view on the display device to display the icons of genealogical records progenically linked with the genealogical record of the first icon, and wherein the icons are arranged according to the progenical link and without displaying the icons of records ancestrally linked with the genealogical record of the icon positioned in the sound docking field.

10. The method according to claim 5, wherein the docking field comprises a first docking field, wherein the genealogical display further comprises a third docking field separate from but in the same view as the displayed first docking field, displayed icons of linked genealogical records, and displayed timeline, wherein positioning the first icon in the third docking field comprises selecting and dragging the icon to the third docking field on the display and wherein positioning the icon in the second docketing field changes the view on the display device to display the icons of genealogical records ancestrally linked with the genealogical record of the first icon, and wherein the icons are arranged according to the ancestral link and without displaying the icons of records progenically linked with the genealogical record of the icon positioned in the second docking field.

11. The method according to claim 5, wherein the timeline comprises a plurality of selectable regions, and wherein selecting one of the selectable regions changes the information displayed about the genealogical record associated with the first icon or highlights one or more icons displayed on the display device.

* * * * *